April 11, 1961 P. D. NEWHOUSE ET AL 2,979,718
AUTOMATIC TARGET TRACKING PASSIVE RADAR APPARATUS
Filed Nov. 19, 1957 4 Sheets-Sheet 1

Commands From
Operator Or Search
Sweep.

United States Patent Office 2,979,718
Patented Apr. 11, 1961

2,979,718
AUTOMATIC TARGET TRACKING PASSIVE RADAR APPARATUS

Paul D. Newhouse, Linthicum Heights, and Charles M. Allen, Jessups, Md., assignors to Westinghouse Electric Corporation, East Pittsburgh, Pa., a corporation of Pennsylvania Filed Nov. 19, 1957, Ser. No. 698,890
19 Claims. (Cl. 343—119)

This invention relates to passive radar apparatus, and more particularly to passive radar apparatus having fixed antennas and including means for automatically tracking a target or targets.

Passive radar apparatus usually employs a pair of directional antennas with overlapping patterns of response in a preselected plane, the antennas being fixed with respect to each other and with respect to the aircraft or other mounting for the passive radar apparatus. The passive radar apparatus ascertains the direction of incidence in the aforementioned plane of an impinging ratio wave by amplitude comparison of the radio-frequency signals provided by the two antennas, and may compute the closing time between the passive radar apparatus and the source of the radio-frequency signal. Four directional antennas may be provided if directional information in two planes is desired.

In two copending applications assigned to the assignee of the instant patent application, there are shown and described apparatus for selecting a passive radar target or source of pulsed radio-frequency energy from a number of targets or sources, and tracking the selected target or source in the presence of other tarkets. One of these copending applications is entitled Radar Target Discriminator, by Paul D. Newhouse, and was filed February 13, 1957, Serial No. 640,051, now Patent No. 2,931,032; the second of these copending applications is entitled Track-While-Search Passive Radar Apparatus, by Paul D. Newhouse, and was filed February 13, 1957, Serial No. 640,052. In both of these copending applications, target selection on the basis of pulse or signal amplitude is accomplished manually by positioning a cursor on a cathode ray target display device, moving the cursor to a position corresponding to the position of the selected target, the cursor having operatively connected therewith circuits for obtaining variable bias voltages, and the bias voltages are applied to low level and high level clipper circuits which, in conjunction with inhibitor or gating apparatus, provide for the passage and use of pulses having a preselected minimum amplitude and having an amplitude not exceeding a preselected maximum, the voltage range between minimum and maximum defining or determining the direction from which used pulses must come, and thereby selecting a target lying in that direction.

In the last named copending patent application, however, the passive radar antennas must be moved by means under the control of an error or difference signal to provide for tracking a target.

In the apparatus of the instant invention, a circuit is provided for tracking a selected target without moving antennas, and to automatically adjust the apparatus for pulse selection of pulses of varying amplitude from the selected target as the selected target moves with respect to the passive radar apparatus. The selected pulses are applied to an integration circuit which, in turn, controls the value of variable bias voltages which are applied to the clipper or pulse selector circuit, so that a closed loop is formed in which the correct bias is automatically maintained on the pulse selector apparatus to provide for continual selection of pulses which had the selected initial amplitude and arriving from the selected target. Target selection may be originally accomplished by commands from the operator of the apparatus in the form of voltages or signals which adjust the biases to preselected levels to thereby "pick up" any target having a preselected pulse amplitude, or by a search sweep voltage applied to the apparatus which varies the bias voltages of the clipper simultaneously at a relatively slow rate from their lower limit values to their higher limit values, to periodically sweep over the entire detection area or field of response of the two directional antennas.

Any number of tracking units may be simultaneously connected to a single pair of fixed directional antennas so that any desired number of targets may be tracked simultaneously in the same plane.

Four antennas are provided with two integrator and pulse selection circuits to provide for tracking any given target in two planes, for example in both azimuth and elevation, the two antennas of the azimuth tracking circuit having predetermined directional patterns of response which overlap in a substantially horizontal plane, and the two antennas of the elevation tracking circuit having predetermined directional patterns of response which overlap in a substantially vertical plane substantially perpendicular to the aforementioned plane of the azimuth antennas.

Accordingly, a primary object of the instant invention is to provide new and improved passive radar apparatus.

Another object is to provide new and improved passive radar apparatus using fixed antennas and having a circuit for automatically tracking a selected radar target.

A further object is to provide new and improved passive radar tracking apparatus employing received pulse amplitude for target selection.

Other objects and advantages will become apparent after a study of the following specification when read in connection with the accompanying drawings, in which.

Figure 1:
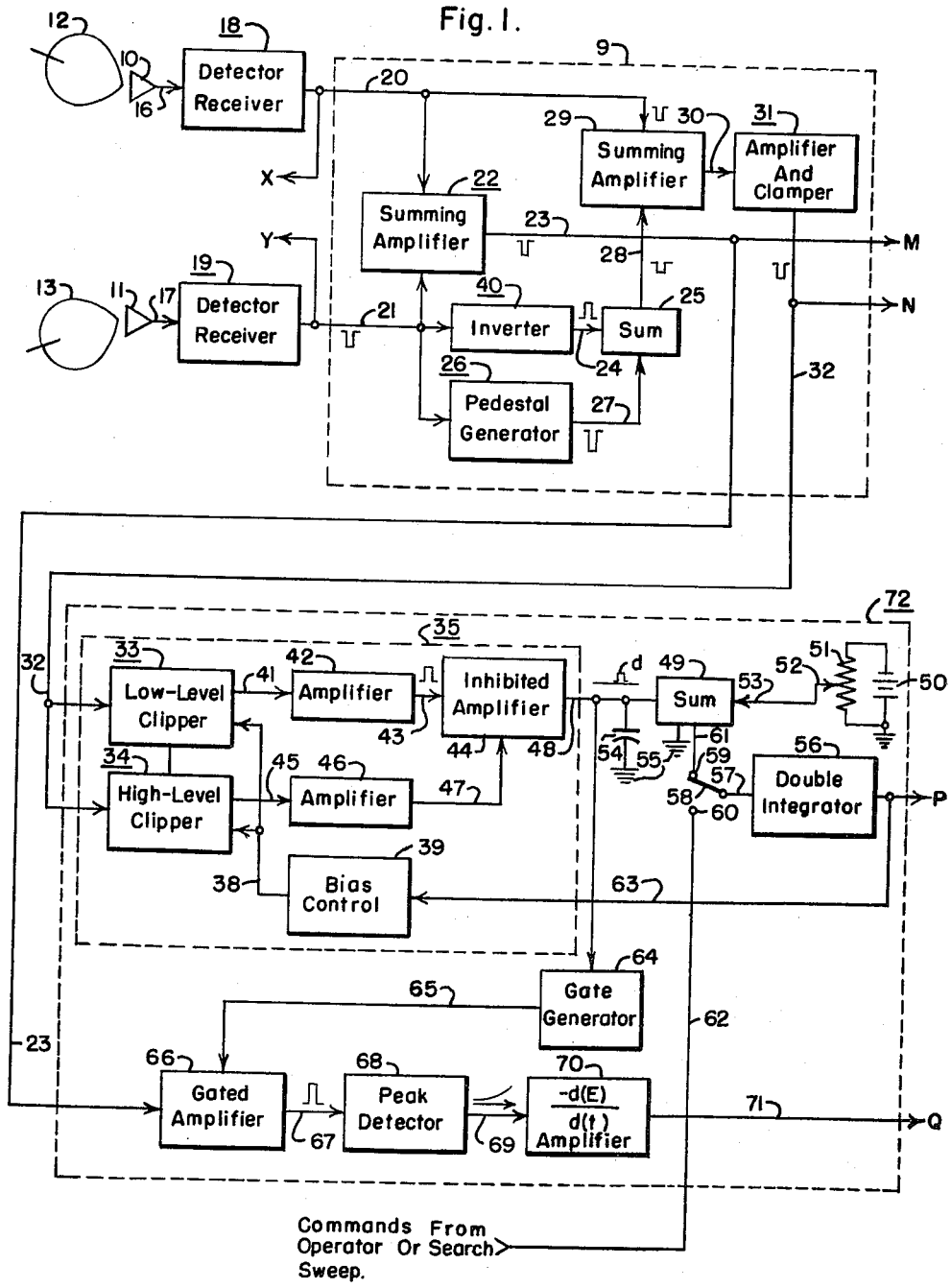
Figure 1 is a schematic electrical circuit diagram, largely in block form, of the preferred embodiment of apparatus for tracking a selected target in a single plane.

Particular reference should be made now to the drawings, in which like reference numerals are used throughout to designate like parts, for a more complete understanding of the invention, and in particular to Fig. 1 thereof. The reference numerals 10 and 11 designate a pair of fixedly mounted directional antennas having preferably similar preselected patterns of response which overlap to a predetermined degree in a preselected plane, the patterns being shown at 12 and 13, respectively. Whereas to facilitate a description of the invention, it has been shown and described with reference to its use on aircraft, it should be understood that apparatus embodying the invention could be used on the ground at a fixed location.

Figure 3:
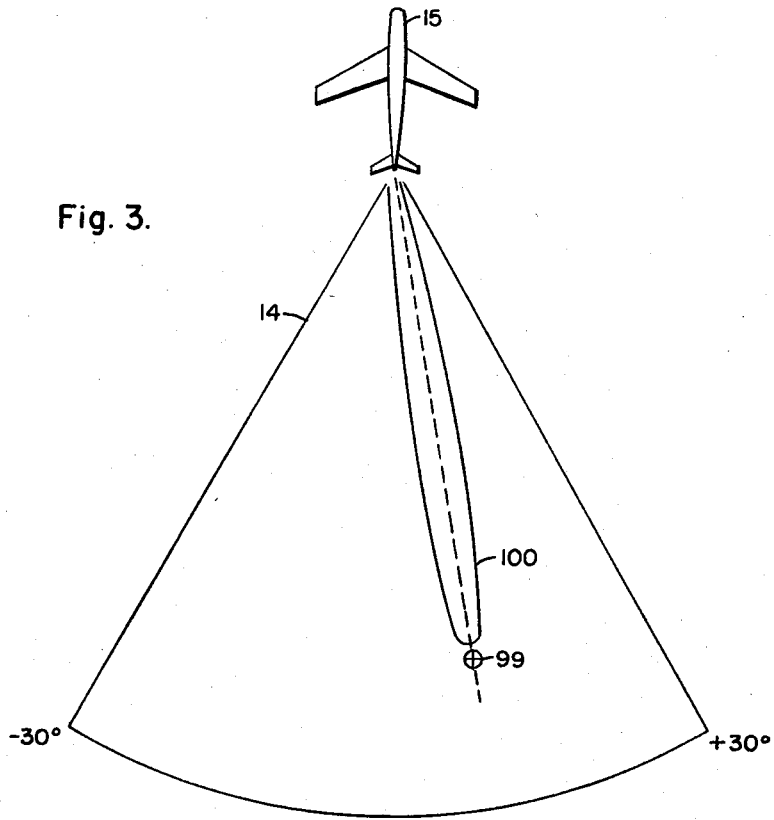
Fig. 3 is a diagrammatic view showing the virtual tracking beam of the passive radar apparatus, and also showing the area or field covered by the patterns of response of the fixed passive radar antennas in one plane.
Figure 4:
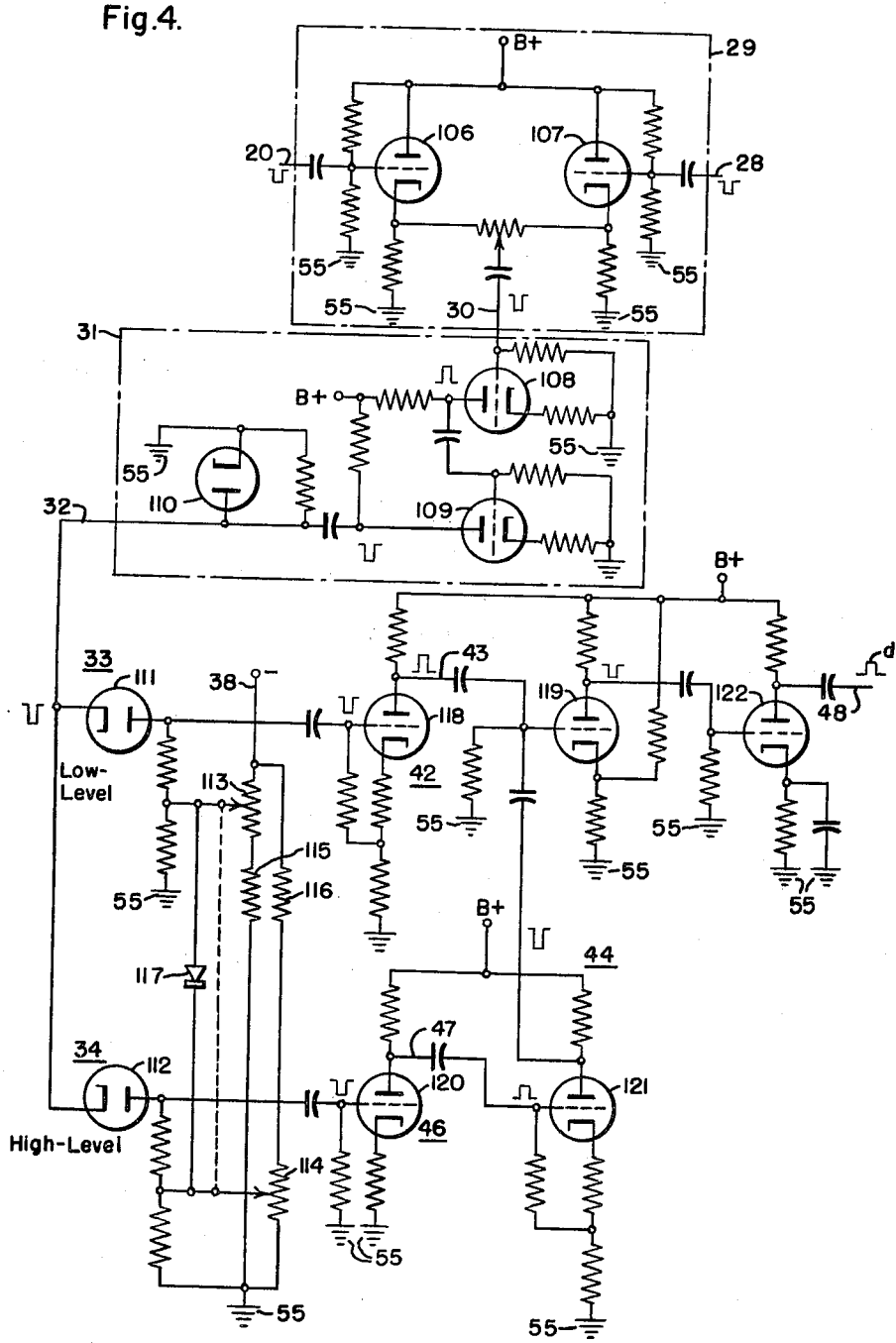
Fig. 4 is a schematic electrical circuit diagram of a portion of the apparatus of Fig. 1.

In Fig. 3, the combined patterns of response of the antennas 10 and 11 are shown to cover an area or field of response 14 which, in accordance with the aforementioned selected directional patterns of response may, for example, cover angular directions from −30° to +30°, in a horizontal plane, with respect to the longitudinal axis of the plane designated 15. The antennas 10 and 11, Fig. 1, are seen to supply radio-frequency energy by conducting means 16 and 17, respectively, to a pair of receivers 18 and 19 respectively, the receivers 18 and 19 being shown in block form and being of any convenient design, but preferably being similar and of the crystal video variety, and constructed and arranged to provide video pulses of similar polarity on their respective output conducting means 20 and 21. Preferably the receivers 18 and 19 include logarithmic amplifiers, and have wide dynamic ranges. Leads 20 and 21 may be connected at X and Y to a multiple target position indicator, not shown, of any convenient design, such for example as cathode ray tube means having pairs of deflection plates. The video pulses on leads 20 and 21 are both applied to a summing amplifier, shown in block form and generally designated 22, the summed pulse output being provided from the summing amplifier 22 on lead 23 and used in a manner which will hereinafter be more fully explained. The pulse output of one receiver, for example, receiver 19, is applied to an inverter of any convenient design, shown in block form and generally designated 40, the inverted output of inverter 40 being a positive pulse which is applied by lead means 24 to a summing amplifier 25. There is also connected to lead 21 a pedestal generator of any convenient design, shown in block form and generally designated 26, the pedestal generator 26 generating a pedestal of preselected constant amplitude at a time coincident with pulses on lead 21, the constant amplitude pedestal being of the same polarity as the pulse on lead 21, that is, negative, and being applied by lead means 27 to the aforementioned summing circuit 25. Preferably the pedestal is of the same width or duration as the pulse on lead 21 which caused it. The output of the summing circuit 25 is accordingly a pulse having an amplitude equal to the difference in amplitudes of the pulses on leads 24 and 27. This difference pulse from summing circuit 25 is applied by conducting means 28 to an additional summing amplifier, shown in block form and designated 29, the summing amplifier 29 also having applied thereto the video pulses on the aforementioned lead 20 obtained from receiver 18. A schematic diagram of summing amplifier 29 is shown in Fig. 4. It will be noted that the pulses applied to the summing amplifier 29 on leads 20 and 28, Fig. 1, are of the same polarity, and since the pulse on lead 28 includes the pedestal pulse from pedestal generator 26 which is always greater than the pulse on lead 24, the output of the summing amplifier 29 is always of the same polarity, that is, negative, regardless of variations in the relative amplitudes of the pulses on leads 20 and 21 with respect to each other.

The pulse output of summing amplifier 29 is applied by lead means 30 to an additional amplifier and clamper circuit, shown in block form and designated 31, the amplifier and clamper circuit being shown in schematic form in Fig. 4. The output of the amplifier and clamper circuit 31 is then a pulse of uniform negative polarity which varies in amplitude with variations in the direction to the selected target as measured in the plane of the field of response 14 of Fig. 3, and this pulse is applied by lead means 32 to a low level clipper circuit, generally designated 33, and a high level clipper circuit, shown in block form and generally designated 34. Clippers 33 and 34 are shown in a schematic circuit diagram in Fig. 4. The high level clipper 34 and low level clipper 33 are parts of an amplitude discriminator circuit which is shown enclosed in dashed line and designated 35, Fig. 1.

Lead 23 carrying the output of the aforementioned summing amplifier 22, and the aforementioned lead 32 carrying the output of the amplifier and clamper 31 may be connected at M and N, respectively, to other tracking units, not shown, in a manner which will become hereinafter more clearly apparent.

Figure 2:
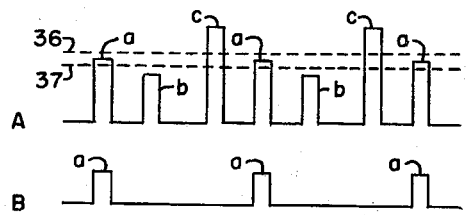
Fig. 2 is a graph illustrating the operation of the apparatus of Fig. 1.

Particular reference should be made now to Fig. 2, in which the operation of the amplitude discriminator circuit 35 and its component parts is illustrated. As stated hereinbefore, in order to track a selected target, it is necessary to eliminate from the tracking circuit pulses received from other targets, and this is accomplished in the instant apparatus by amplitude selection based on the amplitude of pulses received from the target source, it being assumed that, when considered over a brief period of time, these pulses are of substantially equal amplitude, and that pulses received from a non-selected target or targets are of different amplitudes. In Fig. 2, the curve A indicates pulses received at the passive radar apparatus from three sources, the pulses from the three sources being designated $a$, $b$ and $c$, respectively. The pulses from source $a$ arrive at the passive radar apparatus from the target selected for tracking, while pulses $b$ arrive from a second target and pulses $c$ arrive from a third target. Amplitude selection of pulses is accomplished by setting up in the two clipper circuits 33 and 34 a voltage zone, in this case, an azimuth reference voltage zone indicated by the two dashed lines 36 and 37. The low level clipper 33 is constructed and arranged to eliminate, or not pass, pulses arriving on lead 32 which are below the reference zone, or have amplitudes less than the amplitude established by the reference line 37. The low level clipper 33 may include a biased diode as will be seen in Fig. 4, the diode being biased against the passage of pulses which are of an amplitude less than the amplitude corresponding to voltage reference line 37, and passing only the portion of the pulses applied thereto on lead 32 which are of greater amplitude than the reference established by the line 37. The bias applied to the biased low level clipper 33 is obtained from a voltage applied thereto by conducting means 38 from a bias control circuit shown in block form and generally designated 39, the bias control circuit 39 to be described hereinafter in greater detail.

The high level clipper 34 is constructed and arranged to pass pulses that are above the amplitude established by the upper voltage reference line 36, and not to pass, or to eliminate, pulses arriving on lead 32 which have amplitudes less than the voltage corresponding to the line 36. The high level clipper 34 may also be of the biased diode type as shown in Fig. 4 and has the bias thereon set from the bias control circuit 39 by way of conducting means 38. The voltage on conducting means 38 may preferably be somewhat greater in amplitude than the greatest voltages of the reference lines 37 and 36 of Fig. 2, for reasons which will become hereinafter more clearly apparent. The aforementioned low level clipper 33 then, passes pulses having amplitudes greater than the voltage corresponding to the position of line 37, and these pulses are applied by way of conducting means 41 to an amplifier 42 and thence by conducting means 43 to an inhibited amplifier 44; in like manner, pulses passed by the high level clipper 34 and having an amplitude greater than the amplitude corresponding to the position of the line 36 are passed by conducting means 45 to an amplifier 46 and are thence applied by conducting means 47 to the aforementioned inhibited amplifier 44. Preferably, the amplifiers 42 and 46 are similar and have substantially equal gains.

The aforementioned inhibited amplifier 44 is a gated amplifier and is constructed and arranged whereby when pulses simultaneously pass through both the high and low level clippers, the pulse from the high level clipper 34 prevents the passage through the inhibited amplifier 44 of the pulse from the low level clipper 33, and the output is reduced to zero. Stated in other words, a signal will be produced on the output lead 48 of the inhibited amplifier 44 when, and only when, a signal passes through the low level clipper 33 and not through the high level clipper 34, so that any pulse falling within the reference zone established by the lines 36 and 37 has a portion thereof passed by the inhibited amplifier 44. Pulses *a* meet this requirement.

On the other hand, pulses *b* are not passed by either the high level or low level clippers, whereas pulses *c* are passed by both the high level and low level clippers, but the passage of the pulse *c* by the high level clipper 34 inhibits the passage at 44 of the same pulse which is applied thereto from the low level clipper 33, so that the pulse *c* is eliminated on the output lead 48 of the inhibited amplifier. Accordingly, only pulses *a* appear in the output of the inhibited amplifier as illustrated by the curve B of Fig. 2. It should be understood that the curves of A and B of Fig. 2 are not drawn to the same amplitude scale. A schematic electrical circuit diagram of the inhibited amplifier 44 is seen in Fig. 4.

As readily seen from a study of the schematic circuit diagram of Fig. 4, the pulse output of inhibited amplifier 44 on lead 48 is zero while the pulse applied to the amplifier has a peak amplitude which corresponds to the voltage of line 37, and the pulse output has a maximum amplitude established by the reference line 36. The peak of pulse *a* occurs halfway between lines 36 and 37 while the target 99 is substantially centrally located in the virtual tracking beam 100. The pulse *d* output of inhibited amplifier 44 is always of the same polarity. The distance between voltage reference lines 36 and 37 establishes, or corresponds to, the width of the virtual tracking beam 100.

Referring again to Fig. 1, the portions of the selected pulses from the selected target which appear on lead 48 are applied to a capacitor 54 which is connected from lead 48 to ground 55. It is desirable to change the pulse ouput from inhibited amplifier 44 to a direct current voltage substantially independent of the pulse repetition rate. The capacitor 54 is provided for this purpose, and may be of any suitable value. Lead 48 is connected to a summing circuit shown in block form and generally designated 49. To the summing circuit 49 there is also applied a selected direct current potential from a source 50. This source 50 is desirable to provide for zero setting, in a manner which will be readily understood by those skilled in the art. The potentiometer 51, having the adjustable arm 52, is provided for adjusting the value of the zero set voltage on lead 53. Preferably the summing circuit 49 includes electron discharge tubes, such as cathode followers, for isolating the voltages on leads 48 and 53 from each other, and preferably there is provided resistor means of suitable value for leaking the charge off capacitor 54 so that the voltage on lead 48 applied to summing circuit 49 may follow variations in amplitude of pulses in the output of inhibited amplifier 44.

The output of summing circuit 49 on lead 61 is a substantially direct current voltage of varying polarity, being positive or negative depending upon whether the peak amplitude of pulses *a* are above or below the halfway point between lines 36 and 37. While the peak of pulse *a* is halfway between lines 36 and 37, the output of summing circuit 49 on lead 61 is zero. This is provided for by applying to the summing circuit 49 on lead 53 a voltage of a polarity opposite to the polarity of the pulses on lead 48, and equal to one-half the maximum value of the pulses in the output of gated amplifier 44. As aforementioned, the pulse output of 44 is of uniform polarity, and is shown as postive. Assume, for purposes of explanation, that the reference lines 36 and 37 are two volts apart, then the pulses on lead 48 have a maximum amplitude of +2 volts. A negative voltage of −1 volt is supplied to summing circuit 49 on lead 53. Accordingly, the output on lead 61 may vary from −1 to +1 volt, and has an instant amplitude corresponding to the amount the target 99 deviates from the center line of tracking beam 100.

There is provided at 56, a double integrator circuit which may be of any convenient design, the double integrator circuit 56 having an input lead 57 connected to the arm 58 of a single-pole, double-throw switch or relay having contacts 59 and 60. Contact 59 is connected by lead 61 to receive the substantially direct current output of the aforementioned summing circuit 49. Contact 60 is connected by lead 62 to receive commands from the operator of the apparatus, or a search sweep voltage which may be provided as by slowly manually or otherwise moving the arm of a potentiometer over a preselected range to apply a preselected variable voltage which varies within limits to the apparatus, so that the low level clipper and high level clipper are continuously biased over a range of voltages to pick up any pulses occurring within the particular range. The double integrator 56 is constructed and arranged to, in effect, add or subtract in its output changes in pulse amplitude on lead 48, and the output of the double integrator 56 is substantially a direct current voltage having an amplitude which varies in accordance with variations in the direction of the virtual tracking beam and direction to the target source as measured in the field of response 14. The direct current voltage output of the double integrator 56 is applied to lead 63 which may be connected at point P to computing apparatus, not shown, which may, for example, comprise threat evaluation apparatus.

As aforementioned, the direct current output of the integrator 56, which is constant while the input thereto on lead 57 is zero, is also applied by way of lead 63 to the aforementioned bias control or bias obtaining apparatus 39, and the value of the biases applied to low level clipper 33 and a high level clipper 34 are controlled by the value of the voltage applied to the bias control circuit 39 by lead means 63 from the double integrator 56. The double integrator 56, therefore, automatically maintains the biases at 33 and 34 of proper amounts to establish the reference lines 36 and 37 at the desired voltage points. Should the target 99 change its position slightly in the virtual tracking beam 100 and in the azimuth plane, the amplitude of the pulse *d* will change to a small extent, the output of the double integrator 56 will change to a small extent and thereby adjust the values of the biases at 33 and 34 so that the lines 36 and 37 are still maintained respectively at substantially equal distances above and below the peak of the selected pulses *a*. Accordingly, the selected target 99, Fig. 3, once it is locked on, can move to any position in the azimuth plane and the double integrator 56 will automatically readjust the biases at 33 and 34 to provide for continual or further selection of the same pulses from the same target, thereby providing a moving virtual tracking beam such as that shown at 100, Fig. 3.

The output of the inhibited amplifier 44, Fig. 1, on lead 48 is also applied to a gate generator shown in block form and generally designated 64, the gate generator applying a gate by lead 65 to a gated amplifier shown in block form and generally designated 66. The gated amplifier 66 has applied thereto on the aforementioned lead 23, the output of the summing amplifier 22 which is a pulse having an amplitude substantially proportional to the sum of the pulses on leads 20 and 21. Accordingly, only pulses from the selected target are passed by the gated amplifier 66 on lead means 67 to apparatus for obtaining closing time data from the rate of change of the received radar signal strength, and including a peak detector 68, the output of the peak detector 68 being applied by lead means 69 to a differentiating amplifier shown in block form and designated 70. The output of the amplifier 70 is proportional to the reciprocal of the closing time of the signal source, and is provided for obtaining closing time data and applying the closing time data on lead 71 to suitable threat evaluating apparatus which may be connected to lead 71 at point Q, or apparatus for active radar assignment.

The entire amplitude discriminator 35, the double integrator 56 and its associated circuit components, the gate generator 64, gated amplifier 66, peak detector 68 and amplifier 70 comprise a tracking unit generally designated 72. As aforementioned, a similar tracking unit, or a number of similar tracking units, may be connected in parallel with the unit 72 by connecting them at the aforementioned lead points M and N, the other tracking units being biased to track other selected targets having different pulse amplitudes, and to provide additional virtual tracking beams similar to beam 100, Fig. 3.

Particular reference should be made now to Fig. 4 in which there is shown in the detail of an electrical schematic circuit diagram a circuit for use in the summing amplifier 29, in the amplifier and clamper circuit 31, in the low level clipper and high level clipper circuits 33 and 34, in the amplifiers 42 and 46, and in the inhibited amplifier 44, Fig. 1. The aforementioned video pulse on lead 20 is supplied to the control grid of a triode 106, Fig. 4, whereas the aforementioned pulse on lead 28 which represents the difference between the pulse output of inverter 40 and the pulse output of the pedestal generator 26 is applied to the control grid of a triode 107 which is preferably similar to the aforementioned triode 106. These pulses on leads 20 and 28 being of a negative polarity, the output of the summing circuit 29 on lead 30 is a negative pulse, as shown.

The amplifier and clipper circuit shown in block form at 31 is seen in Fig. 4 to comprise a two-stage amplifier having amplifier tubes 108 and 109, the pulse output at the anode of tube 108 being positive, and the pulse output at the anode of the second-stage tube 109 being a negative pulse which is thereafter applied to a clamping tube 110. The negative pulse output from the clamper circuit of tube 110 is applied by way of the aforementioned lead 32 to the aforementioned low level clipper 33 and high level clipper 34, these being shown in Fig. 4 to include a pair of diodes 111 and 112, respectively.

As previously explained, a voltage for biasing the low level clipper 33 and high level clipper 34 is obtained by lead means 38 from a bias control circuit shown in block form and generally designated 39, Fig. 1. The aforementioned double integrator 56 supplies its output on lead 63 to the bias control circuit 39. Preferably, the output of the double integrator 56 is a direct current potential which goes from a minus value or polarity to a positive value for a target going, for example, from −30° to +30° in the aforementioned area or field of response 14 of Fig. 3. As an example, the output voltage of the double integrator 56 may go from a value of −25 volts to a value of +25 volts; for a target at zero angle in the azimuth plane, the double integrator gives a zero voltage output.

The bias control circuit 39 may comprise a circuit for adding a preselected constant direct current voltage of positive polarity to the voltage on lead 63. For example, there may be added in the bias control circuit 39 a voltage of +250 volts, or less. Accordingly, the sum of the added voltage and the voltage output of the double integrator is always positive. This sum voltage is applied to a direct current amplifier of preselected low gain included in the bias control circuit 39, the direct current amplifier causing a polarity reversal, with the result that the output of the direct current amplifier in bias control circuit 39 is a negative voltage with reference to ground 55 which is supplied by way of lead 38 to a resistance network for obtaining biasing voltages, hereinafter to be more fully described, and contained in the low level clipper 33 and high level clipper 34. The varying voltage utilized for obtaining biasing voltages and applied to the clippers 33 and 34 by way of lead 38 may vary about a −250 volt value.

The aforementioned voltage from the bias control circuit 39 on lead 38 is supplied to a resistance network in the low level and high level clippers, the network including a pair of potentiometers 113 and 114 and resistors 115 and 116. The arms of the aforementioned potentiometers 113 and 114 may be ganged together if desired, and are connected by way of respective additional resistance networks to supply the bias voltage to the anodes, respectively, of the aforementioned diodes 111 and 112. The arms of the potentiometers 113 and 114 may be set with respect to each other to provide the desired voltage range as established by the distance between the aforementioned lines 36 and 37 of Fig. 2. The rectifier 117 may be provided to maintain a constant difference between the bias voltages applied to tubes 111 and 112 and connected as shown in the bias control circuit, Fig. 4.

The output of the low level clipper 33 is a negative pulse which is applied to the control grid of an amplifier tube 118, the output at the anode of tube 118 being a positive pulse which is applied by way of lead 43 to the control grid of a gated tube 119. Correspondingly, the output of the high level clipper tube 112 is a negative pulse which is applied to the control grid of an amplifier tube 120, and the output of the amplifier tube 120 is a positive pulse which is applied by way of lead 47 to an inverter tube 121 contained in the inhibited amplifier 44. As previously explained, pulses having amplitudes greater than the voltage established by the reference line 36 are passed by the high level clipper 34 and are inverted in the inhibited amplifier 44 and more particularly in the tube 121 and thence applied to the aforementioned tube 119 to prohibit the passage therethrough of pulses from the low level clipper, with the result that pulses which have amplitudes which fall within the range between the reference lines 36 and 37, and only pulses having such amplitudes, produce pulses $d$ in the output of the inhibited amplifier 44.

The inhibited amplifier 44 is shown, Fig. 4, to include an additional amplifier tube 122, and the output of the inhibited amplifier is a positive pulse $d$ on aforementioned lead 48 which has an amplitude which varies with the angular direction to the selected target in the virtual tracking beam 100 of Fig. 3.

It should be understood that the various sources of anode potential labeled B+ in Fig. 4 are connected to sources of direct current potential, not shown, of suitable value which have their other terminals connected to ground 55.

Figure 5:
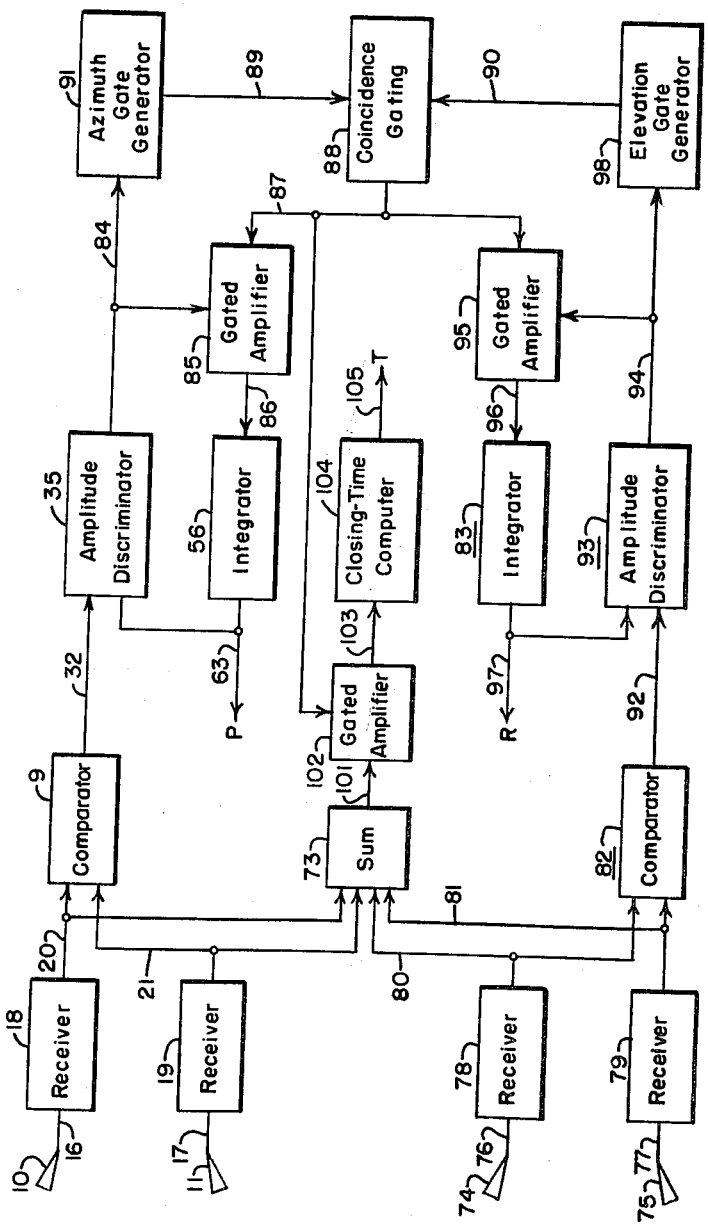
Fig. 5 is a schematic electrical circuit diagram, in block form, of apparatus for tracking a selected target in two manually perpendicular planes, for example, in azimuth and elevation.

Particular reference should be made now to Fig. 5 in which there is shown in block form a circuit for tracking a selected target in two planes with respect to the passive radar apparatus, for example, azimuth and elevation. The pulses on leads 20 and 21 obtained from aforementioned azimuth receivers are applied to a summing amplifier shown in block form and generally designated 73. A pair of elevation antennas are provided, these being designated 74 and 75 and applying their outputs by lead means 76 and 77 to receivers 78 and 79, respectively. The antennas 74 and 75 have preselected directional patterns of response which overlap to a predetermined degree in a vertical plane, and may provide for reception from a target located at an angle of 30° above the axis of the aircraft and from an angle of 30° below the axis of the aircraft, or, in other words, have a field or reception or field of response similar to the field 14 of Fig. 3, but oriented in a plane at right angles to the plane of the field of response 14. Preferably antennas 74 and 75 are similar to antennas 10 and 11, and preferably receivers 78 and 79 are similar to receivers 18 and 19. The outputs of the receivers 78 and 79 are applied by lead means 80 and 81 respectively to the aforementioned summing amplifier 73, and are also applied by lead means 80 and 81 to a comparator circuit shown in block form and generally designated 82. The comparator 82 may be similar to the aforementioned comparator 9, Fig. 1.

As previously stated, the circuit of Fig. 5 is constructed and arranged to track a selected target in both azimuth and elevation. In order to be sure that the tracking of both the azimuth and elevation circuits are with respect to the same target, a coincidence gating arrangement is provided so that both the integrator 56 of the azimuth tracking circuit and an integrator 83 hereinafter to be more fully described for the elevation circuit have applied thereto the same pulses and only the same pulses from the selected target. The output of the amplitude discriminator 35 of the azimuth tracking circuit is applied by way of lead 84, a gated amplifier 85 and lead 86 to the aforementioned azimuth circuit integrator 56. The gated amplifier 85 has applied thereto a gating pulse by way of lead 87 from a coincidence gating circuit 88. The coincidence gating circuit 88, which may be of conventional design, has two inputs applied thereto on leads 89 and 90 and is constructed and arranged to provide a gate output only when the inputs on the aforementioned leads 89 and 90 are pulses of substantially simultaneous occurrence. Lead 89 is connected to receive the output of an azimuth gate which is supplied by gate generator 91 which, in turn, has the generation of the gate therein controlled by the occurrence of pulses on the aforementioned lead 84 connected to receive the output of the azimuth amplitude discriminator 35. As previously explained, the output of the integrator 56 on lead 63 controls a bias control circuit in the amplitude discriminator 35, and lead 63 may be connected at P to a signal utilization circuit which may include apparatus for evaluating threats to the aircraft bearing the passive radar apparatus.

The output of the aforementioned elevation comparator 82 is applied by lead means 92 to an elevation amplitude discriminator shown in block form and generally designated 93, the elevation amplitude discriminator 93 being preferably substantially identical to the aforedescribed azimuth amplitude discriminator 35. The output of the elevation amplitude discriminator 93 is applied by lead means 94 to a gated amplifier shown in block form and designated 95, gated amplifier 95 being connected to receive the coincidence gate on lead 87, the output from the gated amplifier 95 being applied by lead means 96 to the aforementioned elevation circuit integrator 83, the output of the integrator 83 being applied to lead 97 and thence being applied to a bias control circuit in the amplitude discriminator 93. Lead 97 may be connected at R to utilization apparatus of any desired variety. The pulses in the output of the aforementioned amplitude discriminator 93 are also applied by the aforementioned lead 94 to an elevation gate generator shown in block form and designated 98, the elevation gate from the gate generator 98 being applied by way of the aforementioned lead 90 to the aforementioned coincidence gating circuit 88.

The operation of the elevation portion of the aforedescribed circuit is substantially similar to the operation of the azimuth portion and need not be described in detail. In accordance with the position of the selected target in elevation, two reference voltage levels are established in the amplitude discriminator 93, and permit the passage through an inhibited amplifier contained therein of portions of pulses which have amplitudes which fall within the preselected voltage range. These last-named pulses are, in effect, integrated at 83 and utilized to automatically control the bias on certain biased clipping circuits in the amplitude discriminator 93 to thereby insure that as the target moves in a vertical plane with respect to the axis of the aircraft either because of movement of the target or because of movement of the aircraft, the tracking circuits remain "locked on" the selected target.

In Fig. 3, to which particular attention is again directed, as aforementioned, the selected target is indicated at 99 and the aforementioned pattern designated 100 is the virtual tracking beam. As aforementioned, Fig. 3 illustrates only the azimuth tracking portions of the circuit of Fig. 5, it being understood that the target 99 may be also displaced from the reference axis of the aircraft in a substantially vertical plane, and that the apparatus described in Fig. 5 locates the target 99 in elevation and tracks it in elevation as well as in azimuth.

As previously explained, any number of tracking circuits similar to the tracking unit 72 may be provided to permit tracking of a number of targets at the same time. Where it is desired to track a number of selected targets in both elevation and azimuth, a tracking circuit similar to all of the portion of Fig. 5 except the four receivers, the four antennas and two comparators may be provided for each target, the tracking circuits being connected in parallel to the aforementioned leads 32 and 92 in a manner similar to the manner in which additional tracking circuits may be connected at points M and N in Fig. 1, as previously explained.

In Fig. 5, to which particular reference is now again directed, the output of the summing amplifier 73, which has applied thereto inputs by way of leads 20, 21, 80 and 81 from all four of the receivers 18, 19, 78 and 79, respectively, is applied by way of lead 101 to a gated amplifier 102 which also has applied thereto the output on lead 87 of the coincidence gating circuit 88. The output of the gated amplifier 102 is applied by way of lead 103 to a closing time computer shown in block form and designated 104. The passage to the closing time computer 104 of the output of the summing amplifier 73 only after coincidence gating at 102 insures that closing time is computed with respect to the desired target as identified in both the azimuth and elevation planes of reference. The output of the closing time computer 104 may be conveniently applied by lead means 105 to any suitable indicator or ultilization circuit, connected at T.

Whereas a circuit for amplitude discriminator 35 has been shown in Fig. 4, it should be understood that other suitable circuits might be employed.

Whereas the invention has been described with reference to the use of logarithmic amplifiers in the receivers 18, 19, 78 and 79, it should be understood that linear amplifiers with automatic gain control could be employed if desired.

In Fig. 5, it should be understood that both the azimuth and elevation channels may include circuit portions, not shown for convenience of illustration, corresponding to the capacitor 54, summing circuit 49 and zeroing means 50–53, inclusive, of Fig. 1.

Whereas a capacitor 54 has been shown and described as employed to change the pulse output on lead 48 to a direct current voltage substantially independent of the pulse repetition rate, it should be understood that other means, for example, a "box car" type pulse stretcher, not shown, could be employed if desired.

Whereas the invention has been shown and described with respect to a preferred embodiment thereof which gives satisfactory results, it should be understood that changes may be made and equivalents substituted without departing from the spirit and scope of the invention.

We claim as our invention:

1. In passive radar apparatus, in combination, fixed directional antenna means having a plurality of preselected patterns of response which overlap to a predetermined degree in a predetermined manner, and energy utilization means operatively connected to said antenna means for selecting a moving source of radio-frequency energy in said patterns and utilizing the received radio-frequency energy therefrom to automatically continue the selection of energy from the same source as it moves in said patterns, said energy utilization means including means for obtaining a plurality of signals having amplitudes proportion to the instant position of the source in said plurality of patterns of response respectively, a plurality of amplitude responsive signal selector means for said plurality of signals respectively, and integrator means operatively connected to said plurality of signal selector means and supplying a varying control signal thereto in accordance with movement of the source within the patterns of response to thereby vary the amplitude ranges of selected signals.

2. In passive radar apparatus for automatically tracking a selected target source of pulsed radio-frequency energy, in combination, a pair of directional antennas having preselected patterns of response overlapping to a predetermined degree in a predetermined plane, said pair of antennas being fixedly mounted with respect to each other, said pair of antennas being adapted to receive pulses of radio-frequency energy and to supply output signals which vary in amplitude with respect to each other in accordance with variations in the relative amounts of energy reaching said pair of directional antennas from the same target source, and signal utilization means operatively connected to said pair of antennas, said signal utilization means being constructed and arranged to select and use only pulses arriving from a selected direction in accordance with the relative amplitudes of the signals provided by the pair of antennas from radio-frequency energy arriving from said direction, said signal utilization means also including means under the control of the selected pulses for continually varying the amplitude at which pulses are selected in accordance with movement of the selected target source in said plane to thereby provide a virtual tracking beam maintained directed toward said target source.

3. In passive radar apparatus for automatically tracking a selected target source of pulsed radio-frequency energy, in combination, a pair of directional antennas having preselected patterns of response overlapping to a predetermined degree in a predetermined plane and both adapted to receive radio-frequency energy from the same source and to supply output signals, signal utilization means operatively connected to said pair of antennas and adapted to have a varying direct current voltage applied thereto, said signal utilization means being constructed and arranged in accordance with the instant value of the direct current voltage applied thereto to select and use pulses of radio-frequency energy arriving from a selected direction in said plane in accordance with the relative amplitudes of signals provided by said pair of antennas, and voltage supplying means operatively connected to said signal utilization means to receive an input therefrom and to supply said varying direct current voltage at values which vary in accordance with variations in the direction to the selected radio-frequency target source as said selected source moves with respect to the pair of antennas, to thereby provide a virtual tracking beam continuously diected toward the selected target source.

4. In passive radar apparatus for tracking a selected target, in combination, directional antenna means adapted to receive pulses of radio-frequency energy, pulse selector means operatively connected to said antenna means for selecting certain pulses in accordance with their amplitudes, integrator means, means operatively connected to the pulse selector means and to the integrator means for supplying portions of the selected pulses to said integrator means, and means operatively connected to the integrator means and to the pulse selector means for receiving the output of the integrator means and utilizing said output for controlling the amplitude at which pulses are selected.

5. In automatic target tracking passive radar apparatus, in combination, directional antenna means adapted to receive pulses of radio-frequency energy, amplitude responsive pulse selector means operatively connected to said directional antenna means for establishing a virtual tracking beam, signal obtaining means operatively connected to said pulse selector means for obtaining a signal of varying polarity in accordance with the direction a selected target source of pulsed energy deviates from the center line of said virtual tracking beam and having an amplitude corresponding to the distance the target source deviates from said center line, integrator means operatively connected to said signal obtaining means and having said signal applied thereto, and means operatively connected to said integrator means and to said pulse selector means for utilizing the output of the integrator means to automatically adjust the operation of the pulse selector means to maintain said virtual tracking means pointed in the direction of said target source as the target source moves with respect to the passive radar apparatus.

6. In passive radar apparatus for automatically tracking a selected target source of pulsed radio-frequency energy, in combination, a pair of directional antennas mounted in preselected positions with respect to each other and having predetermined directional patterns of response which overlap to a predetermined degree in a predetermined plane, receiver means operatively connected to said pair of antennas and adapted to supply pulse outputs which vary in amplitude in accordance with variations in the relative amounts of energy reaching said pair of directional antennas from the same target source, pulse selector means operatively connected to said receiver means, said pulse selector means being constructed and arranged to select pulses on the basis of their amplitudes with respect to a preselected amplitude range, and range control means including integrator means operatively connected to the pulse selector means and constructed and arranged to utilize the selected pulses to automatically adjust said amplitude range for changes in the amplitude of the selected pulses in accordance with changes in the relative direction to the target source of the selected pulses from said pair of antennas to thereby continue the selection of pulses from the initially selected target source.

7. In passive radar apparatus for automatically tracking a selected target source of pulsed radio-frequency energy, in combination, a pair of directional antennas fixedly mounted in preselected positions with respect to each other and having predetermined directional patterns of response which overlap to a predetermined degree in a predetermined plane, receiver means operatively connected to said pair of antennas and adapted to supply output pulses which vary in amplitude in accordance with variations in the relative amounts of energy reaching said pair of directional antennas from the same target source, pulse selector means including a pair of biased rectifiers operatively connected to said receiver means, said pulse selector means being constructed and arranged to select pulses on the basis of their amplitudes with respect to a preselected amplitude range established by the biases on said rectifiers, and means including integrator means operatively connected to the pulse selector means and constructed and arranged to utilize the selected pulses to automatically adjust said biases and said amplitude range for changes in the amplitude of the selected pulses in accordance with changes in the relative direction to the target source of the selected pulses from said pair of antennas to thereby continue the selection of pulses from the initially selected target source.

8. In passive radar apparatus for automatically tracking a selected target source of pulsed radio-frequency energy, in combination, a pair of directional antennas fixedly mounted in preselected positions with respect to each other and having predetermined directional patterns of response which overlap to a predetermined degree in a predetermined plane, receiver means operatively connected to said pair of antennas and adapted to supply output pulses which vary in amplitude in accordance with variations in the relative amounts of energy reaching said pair of directional antennas from the same target source, pulse selector means operatively connected to said receiver means for selecting pulses on the basis of their amplitudes with respect to a selected amplitude range, said pulse selector means including a pair of biased rectifiers, said biased rectifiers being adapted to have a varying bias control voltage applied thereto, and control voltage obtaining means including integrator means operatively connected to the pulse selector means, said control voltage obtaining means being constructed and arranged to utilize the selected pulses to obtain said varying bias control voltage and to automatically adjust said amplitude range for changes in the amplitude of the selected pulses in accordance with changes in the relative direction to the target source of the selected pulses from said pair of antennas to thereby continue the selection of pulses from the initially selected target source.

9. In passive radar apparatus for automatically tracking a selected target source of pulsed radio-frequency energy, in combination, a pair of directional antennas fixedly mounted in preselected positions with respect to each other and having predetermined directional patterns of response which overlap to a predetermined degree in a predetermined plane, receiver means operatively connected to said pair of antennas and adapted to supply output pulses which vary in amplitude in accordance with variations in the relative amounts of energy reaching said pair of directional antennas from the same target source, pulse selector means operatively connected to said receiver means, said pulse selector means being constructed and arranged to select pulses on the basis of their amplitudes with respect to a preselected amplitude range and to utilize the selected pulses to obtain other pulses of varying polarity and varying amplitude in accordance with changes in the relative direction to the source of the selected pulses from said pair of antennas, and integrator means operatively connected to said pulse selector means for utilizing the other pulses to automatically adjust said amplitude range in accordance with movement of the selected target source in said predetermined plane.

10. In passive radar apparatus for automatically tracking a selected target source of pulsed radio-frequency energy, in combination, a pair of directional antennas having preselected patterns of response overlapping to a predetermined degree in a predetermined plane, said pair of antennas being fixedly mounted with respect to each other, said pair of antennas being adapted to receive pulses of radio-frequency energy and to supply pulsed output signals which vary in amplitude with respect to each other in accordance with variations in the relative amounts of energy reaching said pair of directional antennas from the same target source, and signal utilization means including integrator means operatively connected to said pair of antennas, said signal utilization means being constructed and arranged to select only pulses arriving from a selected target having a selected direction in accordance with the relative amplitudes of the pulse outputs provided by the pair of antennas from radio-frequency energy arriving from said direction, said integrator means being under the control of the selected pulses and being constructed and arranged to continually vary the amplitude at which pulses are selected in accordance with movement of the selected target source in said plane to thereby provide a virtual tracking beam maintained directed towards said target source.

11. In passive radar apparatus for automatically tracking a selected target source of pulsed radio-frequency energy, in combination, a pair of directional antennas having preselected patterns of response overlapping to a predetermined degree in a predetermined plane, said pair of antennas being fixedly mounted with respect to each other, said pair of antennas being adapted to receive pulses of radio-frequency energy and to supply pulsed output signals which vary in amplitude with respect to each other in accordance with variations in the relative amounts of energy reaching said pair of directional antennas from the same target source, and signal utilization means operatively connected to said pair of antennas and including a pair of biased rectifiers for selecting pulses of predetermined amplitudes, signal utilization means also including integrator means under the control of the selected pulses and using only pulses arriving from a selected direction in accordance with the relative amplitudes of the pulse outputs provided by the pair of antennas from radio-frequency energy arriving from a selected target source located in said direction for continually varying the amplitude at which pulses are selected in accordance with movement of the selected target source in said plane to thereby provide a virtual tracking beam maintained directed towards said target source.

12. In passive radar apparatus for automatically tracking a selected target source of pulsed radio-frequency energy, in combination, a pair of directional antennas mounted in preselected positions with respect to each other and having predetermined directional patterns of response which overlap to a predetermined degree in a predetermined plane, receiver means operatively connected to said pair of antennas and adapted to supply output pulses which vary in amplitude in accordance with variations in the relative amounts of energy reaching said pair of directional antennas from the same target source, and pulse selector means operatively connected to said receiver means, said pulse selector means being constructed and arranged to initially select pulses from a selected target on the basis of their amplitudes with respect to a preselected initial amplitude range and to utilize the selected pulses to automatically adjust said amplitude range for changes in the amplitude of the selected pulses in accordance with changes in the relative direction to the source of the selected pulses from said pair of antennas to thereby continue the selection of pulses from the initially selected target source.

13. In passive radar apparatus for automatically tracking a selected target source of pulsed radio-frequency energy, in combination, a pair of directional antennas having preselected patterns of response overlapping to a predetermined degree in a predetermined plane, said pair of antennas being fixedly mounted with respect to each other, said pair of antennas being adapted to receive pulses of radio-frequency energy and to supply pulsed signal outputs which vary in amplitude with respect to each other in accordance with variations in the relative amounts of energy reaching said pair of directional antennas from the same target source, signal utilization means operatively connected to said pair of antennas, said signal utilization means being constructed and arranged to select and use only pulses arriving from a selected direction in accordance with the relative amplitudes of the signals provided by the pair of antennas from radio-frequency energy arriving from said direction, said signal utilization means also including means under the control of the selected pulses for continually varying the amplitude at which pulses are selected in accordance with movement of the selected target source in said plane to thereby provide a virtual tracking beam maintained directed toward said target source, and means operatively connected to said signal utilization means for utilizing the selected pulses to compute the closing time between the passive radar apparatus and said selected target source.

14. In passive radar apparatus for automatically tracking a selected target source of pulsed radio-frequency energy, in combination, a pair of directional antennas having preselected patterns of response overlapping to a predetermined degree in a predetermined plane and both adapted to receive pulses of radio-frequency energy from the same source, pulse utilization means operatively connected to said pair of antennas and adapted to have a varying direct current voltage applied thereto, said pulse utilization means being constructed and arranged to select on the basis of their amplitudes and use pulses of radio-frequency energy arriving from a selected direction in said plane in accordance with the instant value of the direct current voltage applied to the pulse utilization means, and voltage supplying means operatively connected to said pulse utilization means to receive an input therefrom and to supply said varying direct current voltage at values which vary in accordance with variations in the direction to the selected radio-frequency target source as said selected source moves with respect to the pair of antennas, to thereby provide a virtual tracking beam continuously directed toward the selected target source, and means operatively connected to the pulse utilization means for further utilizing the selected pulses to compute the closing time between the passive radar apparatus and said selected target source.

15. In passive radar apparatus for automatically tracking a selected target source of pulsed radio-frequency energy, in combination, a pair of directional antennas fixedly mounted in preselected positions with respect to each other and having predetermined directional patterns of response which overlap to a predetermined degree in a predetermined plane, receiver means operatively connected to said pair of antennas and adapted to supply output pulses which vary in amplitude in accordance with variations in the relative amounts of energy reaching said pair of directional antennas from the same target source, pulse selector means operatively connected to said receiver means, said pulse selector means being constructed and arranged to initially select pulses from a selected target source on the basis of their amplitudes with respect to a preselected initial amplitude range and to utilize the selected pulses to automatically adjust said amplitude range for changes in the amplitudes of the selected pulses in accordance with changes in the relative direction to the source of selected pulses from said pair of antennas to thereby continue the selection of pulses from the initially selected target source, and means operatively connected to said pulse selector means for further utilizing the selected pulses to compute the closing time between the passive radar apparatus and the source of the selected pulses.

16. In passive radar apparatus, in combination, a first pair of fixed directional antennas having preselected patterns of response which overlap to a predetermined degree in a predetermined first plane, a second pair of fixed directional antennas having preselected patterns of response which overlap to a predetermined degree in a second plane substantially perpendicular to the first plane, and energy utilization means operatively connected to all of said antennas for selecting a moving source of radio-frequency energy in both of said planes and utilizing the received radio-frequency energy therefrom to automatically continue the selection of energy from the same source as it moves in both of said planes while excluding energy received from any other sources located in both of said planes.

17. In passive radar apparatus for automatically tracking a selected target source of pulsed radio-frequency energy, in combination, a first pair of fixed directional antennas having preselected patterns of response which overlap to a predetermined degree in a predetermined first plane, a second pair of fixed directional antennas having preselected patterns of response which overlap to a predetermined degree in a second plane substantially perpendicular to the first plane, first pulse utilization means operatively connected to the first pair of antennas for selecting pulses arriving from an initially selected moving source of radio-frequency energy, and second pulse utilization means operatively connected to said second pair of antennas for selecting pulses arriving from the same initially selected moving source, said first and second pulse utilization means including means for continually automatically selecting pulses from the initially selected source as the initially selected target source moves in said first and second planes.

18. In passive radar apparatus, in combination, a first pair of fixed directional antennas having preselected patterns of response which overlap to a predetermined degree in a predetermined first plane, a second pair of fixed directional antennas having preselected patterns of response which overlap to a predetermined degree in a second plane substantially perpendicular to the first plane, and energy utilization means operatively connected to all said antennas for selecting a moving source of radio-frequency energy in both of said planes and utilizing the received radio-frequency energy therefrom to automatically continue the selection of energy from the same source as it moves in both of said planes while excluding energy received from any other sources located in both of said planes, said energy utilization means including means for computing the closing time between the passive radar apparatus and said moving source.

19. In passive radar apparatus for automatically tracking a selected source of pulsed radio-frequency energy, in combination, a first pair of fixed directional antennas having preselected patterns of response which overlap to a predetermined degree in a predetermined first plane, a second pair of fixed directional antennas having preselected patterns of response which overlap to a predetermined degree in a second plane substantially perpendicular to the first plane, first pulse utilization means including pulse amplitude discriminator means operatively connected to said first pair of antennas for selecting pulses received from an initially selected source of radio-frequency energy, and second pulse utilization means including pulse amplitude discriminator means operatively connected to said second pair of antennas for selecting pulses received from the same initially selected source, said first and second pulse utilization means being constructed and arranged to automatically continue the selection of pulses from the initially selected source as the initially selected source moves in said first and second planes.

References Cited in the file of this patent

UNITED STATES PATENTS 2,817,835    Worthington  ----------- Dec. 24, 1957